Patented Mar. 11, 1930

1,750,087

UNITED STATES PATENT OFFICE

WARREN F. BLEECKER AND ELLSWORTH A. CLARK, OF BOULDER, COLORADO

PAINT, VARNISH, AND ENAMEL AND A METHOD OF THEIR PRODUCTION

No Drawing. Application filed November 12, 1923. Serial No. 674,201.

Our invention relates to paints and a process for their production and its primary object is to provide a composition of substances hereinafter to be described, applicable to all of the variety of purposes for which paints, varnishes, enamels and similar coatings are generally used, but distinguished from other materials of the same kind by its properties of dielectric strength, elasticity, resistance to the influence of acids and other chemicals, durability and coherence in a dry condition.

Another object of the invention is to produce a base for use in the manufacture of paints, varnishes or enamels of the above described character, which imparts to the composition the hereinabove mentioned distinctive characterstics and which by itself, may be employed for the impregnation of porous substances, and still another object resides in providing an economic, simple and highly efficient process for the production of the base and the coating materials of which it is a determining constituent.

The principal ingredients of the base are rubber, sulfur and an oil chemically combined into a gum which by the application of heat, may be liquefied for use as an impregnating substance or for the production of paints, varnishes and enamels by intermixture with other ingredients.

It is preferred and it is an aim of our invention to employ in the production of the base, vulcanized rubber which provides both the caoutchouc and the sulfur in the desired proportions. In this respect, the economic advantages of our invention will be readily apparent since worn rubber tires and inner tubes and other discarded articles made of vulcanized rubber may be used for the purpose without preparation other than their division into small strips or particles.

The oleic substance used in producing the base is preferably a non-drying lard oil of the animal group, although under certain conditions, mineral oils such as paraffin or petroleum, or vegetable oils, as for example, cottonseed oil, may be employed to advantage.

A mixture of 90% of vulcanized rubber (or raw rubber 81% and sulfur 9%) and 10% of oil is well adapted for the purposes of our invention.

The process of preparing the base consists in first cutting the rubber into small particles (rubber tires and the like may be ground, if desired) and adding about 850 parts in weight of the finely divided rubber to 100 parts of the lard oil after the latter has been heated to a temperature of approximately 450° Fahrenheit.

The rubber is immerged in the heated oil slowly and in small quantities, while the above stated temperature which is an important factor of the process, is constantly maintained.

If raw rubber and sulfur are used in the place of vulcanized rubber, the two substances are heated together in the proper proportions and then added to the oil as before, but in each case, the temperature of the oil must be not less than 350° F. since below that temperature, the reaction which causes the complete chemical combination and permanent solution of the rubber in the oil does not take place.

Owing to the chemical action of the oil on the vulcanized rubber or the rubber-sulfur compound, the rubber is permanently combined with the oil and in this respect the base and the paints, varnishes or enamels of which it is the determining component, differ from ordinary rubber paints which merely consist of rubber in solution and from which the rubber may be recovered by removing the solvent.

The product of the process with the materials in the above stated proportions, is a gum containing about 90% rubber and 10% oil, the evaporation of the oil being taken in consideration, and this product constitutes a base in its simplest form, adapted for use in the manufacture of paints, varnishes and enamels of the hereinabove mentioned distinctive properties.

The base may, as stated before, be employed per se to impregnate porous substances, particularly those which in use are required to withstand the corrosive action of acids and other chemicals, the impregnation being effected by either dipping the substances into the base in a molten condition, or by applying the base in the same condition to the surfaces of the substances by flowing, brushing or other similar expedient.

The base in its simplest form may be enriched by the addition of an asphalt in case it is used in the manufacture of paints, varnishes and enamels required to give a hard and glossy, black coating to the surfaces to which it is applied, it being understood that aside from these attributes to the properties of the base, the asphalt also increases its elasticity and non-porosity in a dried condition.

A suitable proportion is one part of the rubber-oil base and two parts of asphalt, and it is preferred to compose the asphaltic ingredient of one part of gilsonite and one part of petroleum-asphalt.

The production of paints, varnishes and enamels from the base either in its simplest form or with the added asphalt, is effected by intermixing it in liquid form with an appropriate thinning medium. Equal parts by volume of the two ingredients, gives a paint, varnish or enamel well adapted for general purposes.

A thinning medium particularly suitable for the manufacture of coating materials of which the base is the determining element, is a product of the distillation of pine stumps known in commerce as Leptyne. Turpentine, gasoline, naphtha and other volatile soluble liquids may also be used with or without the addition of pigments to give the required color.

In paints and varnishes in which the distinctive properties of asphalt are not required, a filler may be added to the base either separately or together with a thinning medium. It is the purpose of the filler to give body to the mixture and the consistency of the latter can be varied to any desired extent by the proportion of the thinning agent.

The filler which preferably consists of a finely divided solid may also be varied according to the required color, as is usual in the manufacture of ordinary paints, zinc oxide, for example, producing a white paint, Ferric oxide, a red paint, chrome oxide, a green paint, etc.

One hundred parts by weight of the filler and 100 parts of the base, mixed together with 150 parts of the thinning medium, will produce a composition suitable for all ordinary uses.

A paint or varnish made in accordance with our invention as hereinabove described, with either asphalt or a filler added to the base, may be air-dried after it is applied in the usual manner, and as such provides an elastic, chemically-resistant and dielectric coating particularly adapted for use in the manufacture of articles, fabrics and other materials requiring a high degree of non-conductivity or it may for the same purpose be baked and as such produce a durable enamel which retains an unusual amount of its flexibility.

Having thus described our invention, what we claim and desire to secure by Letters Patent is:

1. A base for chemically-resistant and dielectric paints and kindred compositions, consisting of vulcanized rubber combined with lard-oil.

2. A base for chemically-resistant and dielectric paints and kindred compositions, consisting of a chemical combination of 90% of vulcanized rubber and 10% of a non-drying oil.

3. A base for chemically-resistant and dielectric paints and kindred compositions consisting of a chemical combination of 81% of raw rubber, 9% of sulfur, and 10% of an oil adapted to dissolve vulcanized rubber.

In testimony whereof we have affixed our signatures.

WARREN F. BLEECKER.
ELLSWORTH A. CLARK.